United States Patent [19]

Lenoski

[11] Patent Number: 4,819,165

[45] Date of Patent: Apr. 4, 1989

[54] SYSTEM FOR PERFORMING GROUP RELATIVE ADDRESSING

[75] Inventor: Daniel E. Lenoski, Mountain View, Calif.

[73] Assignee: Tandem Computers Incorporated, Cupertino, Calif.

[21] Appl. No.: 31,486

[22] Filed: Mar. 27, 1987

[51] Int. Cl.⁴ .................. G06F 12/10; G11C 8/00
[52] U.S. Cl. ................................................ 364/200
[58] Field of Search ............................. 364/200, 900

[56] References Cited

U.S. PATENT DOCUMENTS

| 4,047,247 | 9/1977 | Stanley et al. | 364/200 |
| 4,084,227 | 4/1978 | Bennett et al. | 364/200 |
| 4,179,738 | 12/1979 | Fairchild et al. | 364/200 |
| 4,206,503 | 6/1980 | Woods et al. | 364/200 |
| 4,218,757 | 8/1980 | Drogichen | 364/900 |
| 4,240,139 | 12/1980 | Fukuda et al. | 364/200 |
| 4,439,828 | 3/1984 | Martin | 364/200 |

Primary Examiner—Felix D. Gruber
Attorney, Agent, or Firm—Townsend & Townsend

[57] ABSTRACT

An address generation system that generates a second address relative to a first address by either incrementing, decrementing, or passing unchanged, as determined by the control digits in a LIT field, the digital number encoded by the most significant bits of the first address and substituting a selected subset of the digits in the LIT field for the least significant bits of the first address. The first address may be the program counter address and the second address the target address of a branch instruction.

5 Claims, 2 Drawing Sheets

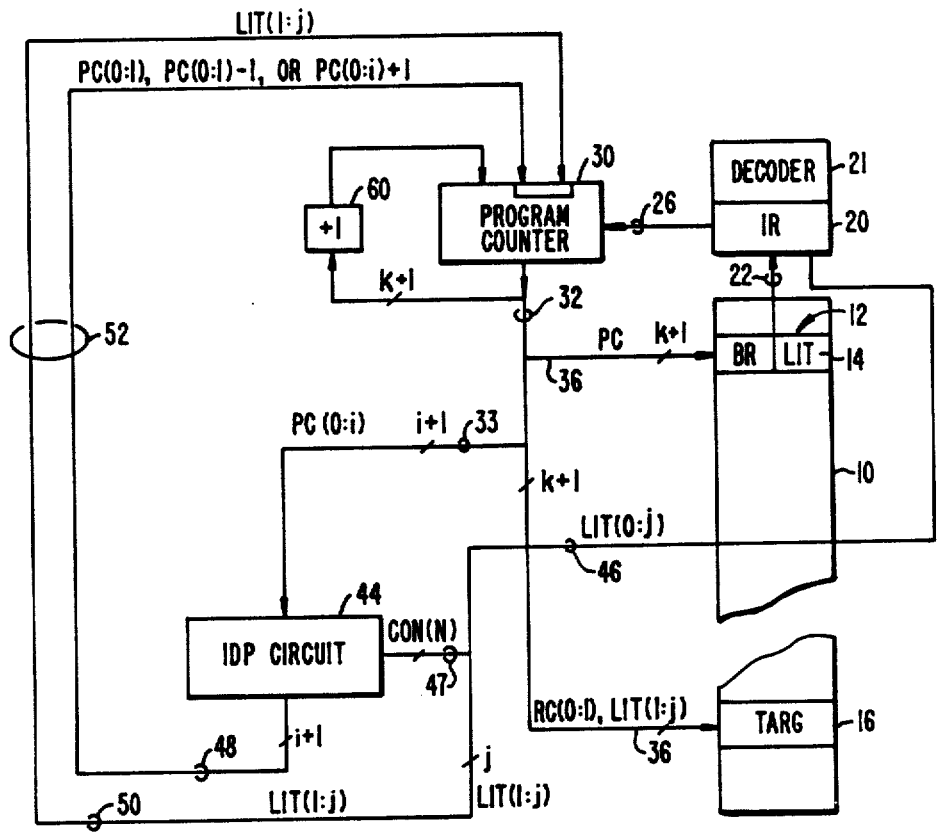
FIG.__1.
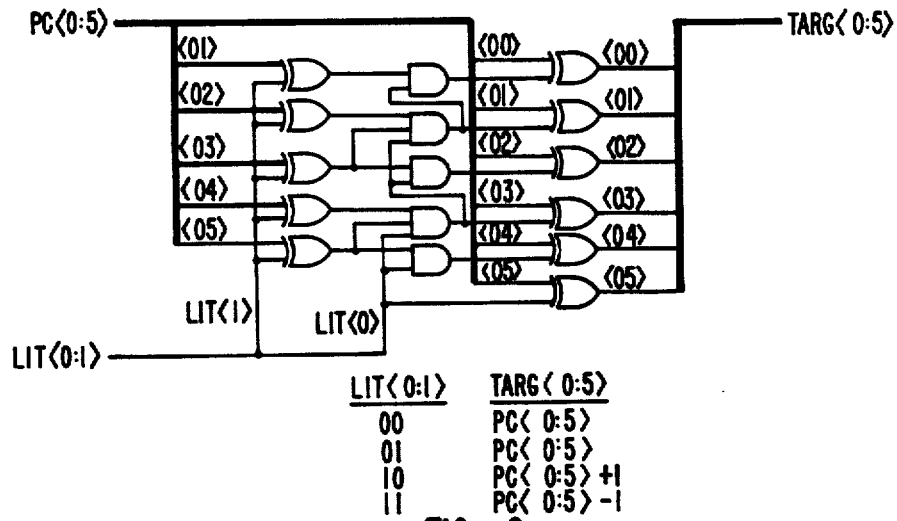
FIG.__2.

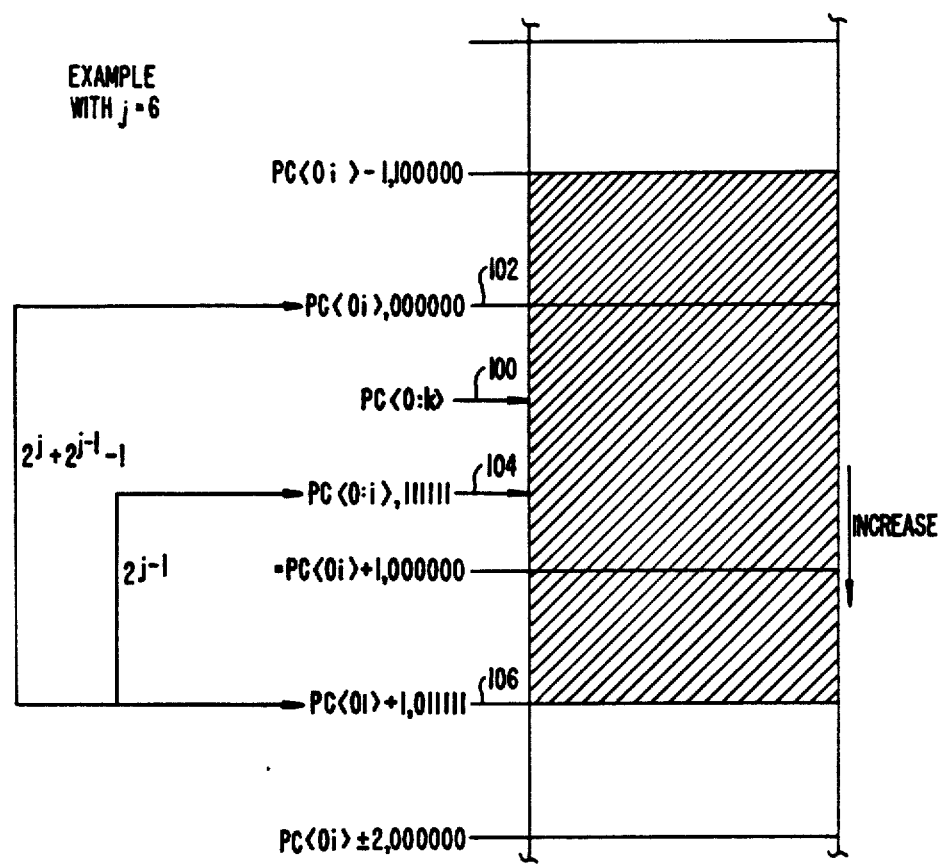
FIG._3.

SYSTEM FOR PERFORMING GROUP RELATIVE ADDRESSING

BACKGROUND OF THE INVENTION

1. Field of the Invention

The invention relates generally to address generation systems in digital computers and specifically to a system for generating an address relative to an existing address.

2. Description of the Prior Art

Generally, a jump or branch instruction requires the provision of a target address to access the next instruction in a program sequence. Two existing addressing techniques are described in the literature. The first is absolute addressing in which the target address is usually fully specified within the literal (LIT) field of an instruction. The second is relative addressing in which the literal is taken as on offset from the current PC address.

Absolute addressing causes one of two problems depending upon the implementation. As it is generally used, it must allow for the embedded LIT field to be the same size as the target address (k+1 bits) for a $2^k$ bit memory. This is very costly since it wastes memory locations to store these bits, and memory bandwidth to load the instruction along with the fully specified address. If absolute addresses are used with a LIT field that is smaller than the k+1 bits of total address than absolute addressing cannot guarantee both positive and negative offsets in the addressing range independent of the PC.

Relative branching reduces the size of LIT encoding, and takes advantage of the fact that most addresses can be arranged to be within a small range around the value of the PC. For a (j+1) bit LIT field, the relative address range is usually from $+2^j-1$ to $-2^j$. Additionally, a full k+1 bit adder is required to add the LIT field to PC, thereby imposing additional hardware and timing delay requirements on the system.

Both Absolute and Relative Addressing have been used on many computer systems.

Accordingly, a need exists for a system that guarantees positive and negative offsets from any PC value without wasting memory bandwidth and requiring excessive hardware and time delays.

SUMMARY OF THE INVENTION

The present invention is a system for generating a second address relative to a first address. In a preferred embodiment, the upper digits of the first address are transformed into the upper bits of the second address by hardware controlled by selected control digits in an externally supplied literal field of digits. The second address is formed by running in parallel the transformed upper bits of first address and a subset of digits provided by the literal field. The transformed digits form the upper digits of the second address and subset of digits from the literal field forms the lower digits of the second address.

In one embodiment, the hardware providing means for transforming the upper bits of the first address includes an input bus, referred to as the second input bus, for transmitting the upper digits of the first address to the input port of an (i+1) bit increment, decrement, pass (transmit without changing) (IDP) circuit. The IDP circuit includes a control input port and an output port coupled to a second output bus.

According to a further aspect of the invention, the literal field is stored in the memory of a processor. A (j+1) digit literal field is accessed by the program counter address (PC) which is the address to be transformed into a target address. The upper two bits, LIT(0:1), of the LIT field control the IDP circuit to transfer PC(0:i), PC(0:i)−1, or PC(0:i)+1 to the second output bus, where PC(0:i) comprises the upper (i+1) bits of PC.

The lower j bits, LIT(1:j), are transmitted on a third output bus. The second and third output buses run in parallel to form a PC input bus carrying a target address, TARG(0:k), having as its upper bits the transferred bits PC(0:i), PC(0:i)−1, or PC(0:i)+1 and having as its lower bits the field LIT(1:j). This address generation system is denoted group relative addressing.

There are three major improvements of Group Relative Addressing over Purely Relative Addressing. The first is the reduced amount of hardware required. Group Relative Addressing needs only a simple increment, decrement or pass circuit over the upper i+1 bits of the PC. This combined function can be fairly simply realized. Normal Relative Addressing requires a full adder over the entire k bits.

Another major improvement is the faster speed obtainable by the simpler logic of Group Relative Addressing. Finally, in cases where the address (PC) of the instruction with the group relative branch can be adjusted group relative addressing can increase the range of the address possible with normal relative addressing. When this is possible, then Group Relative Addressing allows a range of addressing of $+/- (2^j+2^{j-1}-1)$, whereas normal Relative Addressing only allows $-2^j$ to $+2^j-1$.

Other features and advantages of the invention will be apparent from the following detailed description and appended drawings.

BRIEF DESCRIPTION OF THE DRAWINGS

FIG. 1 is a schematic diagram of an embodiment of the invention.

FIG. 2 is a circuit diagram of an increment, decrement, or pass circuit.

FIG. 3 is a schematic diagram of the address space of a memory illustrating the range of group relative addressing.

DETAILED DESCRIPTION OF THE PREFERRED EMBODIMENT

FIG. 1 is a schematic diagram of a preferred embodiment of the invention. Referring now to FIG. 1, a memory 10 includes a branch instruction 12, a LIT field 14 and a TARG address (instruction) 16. The memory 10 is coupled to an instruction register 20 by data bus 22. The instruction register 20 is coupled to decoder 21 having various output control lines 26. A program counter 30 has a control port, coupled to one of the control lines from a decoder 21, first and second input ports, and an output port coupled to a first output bus 32, PC(0:k). The first output bus is a k+1 bit bus for carrying a first digital signal generated by the program counter 30. The most significant bit (MSB) of the first digital signal is carried on the conductor of the bus labeled by the index 0 and the least significant bit (LSB) is carried on the conductor of the bus labeled k. Generally, the upper bits of a digital signal are carried on the conductors labeled by low indices and the lower bits are carried by conductors labeled by high indices.

The first digital signal is a program counter address (PC) that accesses an instruction in the memory 10 at a storage location corresponding to the address encoded by the PC. This accessing of the instruction is shown symbolically by the lines 36 from the first output bus 32 to the various instructions in the memory 10.

The (i+1) upper MSB bits of the first output bus 32 are coupled to the (i+1) conductors of a first input bus 33, PC(0:i). This first input bus 33 is coupled to the input port of an increment, decrement, or pass (IDP) circuit 44.

A second input bus 46, LIT (0:j), is a (j+1) bit bus for transmitting the (j+1) bit LIT field stored in the instruction register 20. The first two conductors of the second input bus are connected to the two conductors of a control bus 47, LIT (0:1) Control bus 47 is coupled to the control port of IDP circuit 44.

A second output bus 48 is an (i+1) bit bus coupled to the output port of the IDP circuit 44. A third output bus 50, LIT (1:j) is a j-bit bus comprised of all but the first conductor of the j+1 bit second input bus.

The second and third output buses 48 and 50 are run in parallel to form a PC (k+1) input bus (k+1) bit outpt bus 52, TARG (0:k), with the lower j-bits of the PC input bus 52 comprising the conductors of the j-bit LIT (1:j) bus 50 and the upper (i+1) bits carried on the conductors of the i+1 bit second output bus 48.

The PC input bus 52 is coupled to the second input port of the program counter 30. An incrementer 60 has an input port coupled to the first output bus 32 and an output port coupled to the first input port of the program counter 30.

It is understood that FIG. 1 depicts only features of the address generation system required to implement the invention. Various registers, gates, and other standard hardware features are not depicted.

The operation of the system of FIG. 1 will now be described. During execution of a program, the instructions stored sequentially in the memory 10 are executed one after the other. The program counter 30 supplies a program counter address (PC) for accessing each instruction. The address PC is also supplied to incrementer 60 which provides the address PC+1 to the first input port of the program counter 30. A control signal from the decoder 24 loads this signal at the first input port of the program counter 30 into the program counter 30.

The above-described procedure is modified when a branch instruction is received. A branch instruction, including a (j+1) bit LIT field, is loaded into the instruction register from memory at the program counter address (PC). The LIT field is placed on the second input bus 46. The upper (i+1) bits of the program counter address, PC(0:i) are transmitted to the first input port of the IDP circuit 44 and the lower two bits of the LIT field, LIT(0:1) are transferred to the control input port of the IDP circuit 44 by the control bus 47.

Depending on the value of this control field, LIT(0:1), either the address PC(0:i), PC(0:i)−1, or PC(0:i)+1 is transferred to the second output bus 48 by IDP circuit 44. The third output bus 50 carries the lower j-bits of the LIT field. The second and third output buses 48 and 50 run in parallel to form the PC input bus 52 which transmits the target address, TARG(0:k), having its lower j-bits comprising the signal carried on the third output bus 50 and its upper (i+1) bits comprising the signal carried on the second output bus 48. The target address is transferred to the second input port of the program counter 30 by the PC input bus 52. Thus, it is required that i+1+j=k+1.

FIG. 2 is a circuit diagram of the IDP circuit 44 used in the preferred embodiment. The circuit includes AND gates 60 and XOR gates 62 connected as illustrated.

A control signal from the decoder 24 loads the signal at the second input port into the program counter 30. The next address supplied by the program counter to the program counter output bus 32 will be the target address. Accordingly, the instruction addressed by TARG (0:k) will be accessed and transferred to the instruction register 20 in the next operation cycle.

The operation of the preferred embodiment is illustrated by the following truth table:

| CONTROL CODE LIT(0:1) | PC(0:i) | LIT(1:j) | TARG(0:k) |
|---|---|---|---|
| 10 | PC(0:i) | LIT(1:j) | PC(0:i),LIT(1:j) |
| 11 | PC(0:i) | LIT(1:j) | PC(0:i),LIT(1:j) |
| 00 | PC(0:i) | LIT(1:j) | PC(0:i)+1,LIT(1:j) |
| 01 | PC(0:i) | LIT(1:j) | PC(0:i)−1,LIT(1:j) |

From this truth table it can be seen that the LIT field performs two functions. The upper two bits of the LIT field control are formed, via IDP circuit 44, whether the upper (i+1) bits of the TARG(0:j) field are equal to the upper (i+1) of the PC field or to the incremented or decremented upper (i+1) bits of the PC field. Additionally, the lower j-bits of the LIT field form the lower j-bits of the TARG(0:j) field. The MSB of the LIT(1:j) field performs the dual function of control and substitution. Accordingly, the value of this bit is constrained by the required control function.

FIG. 3 is a schematic diagram of the address space of the memory 10. This diagram illustrates the range of the group relative address system of the present invention. In FIG. 3, it is assumed that j is equal to 6 and the direction of increasing address values is down. Referring now to FIG. 3, the location of the address PC(0:k) is indicated by the arrow 100.

The lower bits of PC(0:k) 100 are some arbitrary combination of 1's and 0's. The magnitude of the positive offset of the group relative addressing system is determined by the composition of these lower 6 bits. The two extreme possibilities are indicated by arrow 102, lower 6 bits all 0's, and arrow 104, lower 6 bits all 1's.

The maximum possible offset of the system is generated by incrementing PC(0:i) by 1 and substituting the greatest value of the LIT field, (011111), for the lower 6 bits of PC, as indicated by arrow 106. Note that the MSB of the LIT field must be 0 because of the constraint due to the control function. If the original lower 6 bits of the PC field were all 0's then the maximum possible offset is $2^j+2^{j-1}-1$. The value of the minimum, or guaranteed, offset, from a PC having 1's for its lower 6 bits 104, is $2^{j-1}$. The maximum and guaranteed offsets values for negative offsets are analogously determined.

The following table indicates the guaranteed maximum and average possible offset of the original PC field.

Guaranteed Offset from PC = $+/-2^{j-1}$

Maximum Offset from PC = $+/-(2^j+2^{j-1}-1)$

Average Possible Offset from PC = $+/-2^j$

Thus, by adjusting the addresses of branch instructions to have all 0's in the least significant bit places, the positive range of the group relative addressing system can be maximized for positive offsets. The above analysis is directly applicable to negative offsets. In the negative offset case, the range is maximized for branch address addresses having 1's in the lower j-bits of the branch address field.

The invention has now been described with reference to a preferred embodiment. Modifications and substitutions to this preferred embodiment will now be apparent to persons of ordinary skill in the art. Other circuitry for implementing the increment, decrement, or pass circuit may be utilized. Further, the address generated may be utilized to access data as well as instructions. Additionally, other sources of the PC and LIT fields, e.g., registers, or cache memory may be utilized. Accordingly, it is not intended that the invention be limited except as provided by the appended claims.

I claim:

1. An address generation system for generating a second address relative to a first address where the first address is encoded by a set of binary digits with the upper digits of the set encoding the most significant digits of the first address and the lower digits of the set encoding the least significant digits of the first address, said system comprising:
    means for transforming a selected subset of the upper digits of the first address into the corresponding upper digits of the second address, which may be the same or different than the selected subset of upper digits of the first address;
    means for substituting a selected subset of the lower digits of the second address for the corresponding subset of lower digits of the first address.

2. An address generation system of the type that receives a digital (LIT) field and uses the LIT field to generate a second address relative to a first address, the system comprising:
    an IDP circuit, including an input port, output port and control port, for generating an IDP output signal comprising a given number of bits at its output port, with the value encoded by the IDP output signal equal to the incremented, decremented or passed (unchanged) signal received at the input port as determined by a control code encoded by a control signal received at the control port;
    means for transferring a selected subset of the most significant bits of said first address to the input port of said IDP circuit, with the number bits in said subset equal to said given number,
    means for transferring a first selected subset of the binary digits in said LIT field to the control port of said IDP circuit, with the control code encoded by said selected subset determining the value of said IDP output signal; and
    means, coupled to said IDP circuit, for combining the IDP output signal with a second subset of the bits in the LIT field to form the second address, with the bits of the IDP output signal forming the most significant bits of the second address and with the second subset of bits forming the least significant bits of the second address.

3. The invention of claim 2 wherein:
    said first address is a program counter address;
    said LIT field is associated with a branch instruction accessed by said program counter address;
    said first selected subset includes the two most significant bits of said LIT field; and
    the second selected subset includes all but the most significant bit of said LIT field.

4. The invention of claim 3 wherein said LIT field is stored in a first register, said program counter address is stored in a second register, and said means for transferring a selected subset of the most significant bits of said first address comprises:
    a first input bus coupling the output port of said second register to the input port of said IDP circuit;
    wherein said means for transferring said first selected subset comprises:
        a control bus coupling the output port of said first register to the control port of said IDP circuit; and
    wherein said means for combining comprises:
        a first output bus, coupled to the output port of said IDP circuit, for transmitting the given number of most significant bits of said second address; and
        a second output bus, coupled to the output port of said first register, for transmitting the least significant bits of said second address.

5. A branch target address (TARG) generation system that utilizes a LIT field associated with a branch instruction accessed by a given program counter address (PC) to generate TARG relative to PC, where the LIT field is stored in a first register and PC is stored in a second register, said system comprising:
    an IDP circuit, including an input port, output port and control port, for generating an IDP output signal comprising a given number of bits at its output port, with the value encoded by the IDP output signal equal to the incremented, decremented or passed (unchanged) signal received at the input port as determined by a control code encoded by a control signal received at the control port;
    a first input bus, coupling the output port of the second register to the input port of said IDP circuit, for transferring PC to said IDP circuit;
    a control bus, coupling the output port of the first register to the control port of said IDP circuit, for transferring the control code, being a control subset of the digits in the LIT field, to the control port of said IDP circuit;
    a first output bus, coupled to the output port of said IDP circuit, for transmitting said given number of most significant bits of the TARG; and
    a second output bus, coupled to the output port of the first register, for transmitting a selected subset of the digits in said LIT field which forms the least significant bits of the TARG.

* * * * *